(12) United States Patent
Suzuki et al.

(10) Patent No.: US 9,713,944 B2
(45) Date of Patent: Jul. 25, 2017

(54) TIRE CONDITION DETECTION DEVICE

(71) Applicant: DENSO CORPORATION, Kariya, Aichi-pref. (JP)

(72) Inventors: Youichirou Suzuki, Nishio (JP); Akira Takaoka, Nishio (JP); Takashi Saitou, Nishio (JP); Nobuya Watabe, Kariya (JP); Masashi Mori, Kariya (JP); Takatoshi Sekizawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/122,820

(22) PCT Filed: Feb. 26, 2015

(86) PCT No.: PCT/JP2015/001004
§ 371 (c)(1),
(2) Date: Aug. 31, 2016

(87) PCT Pub. No.: WO2015/141152
PCT Pub. Date: Sep. 24, 2015

(65) Prior Publication Data
US 2017/0057306 A1    Mar. 2, 2017

(30) Foreign Application Priority Data

Mar. 18, 2014 (JP) .................... 2014-054928

(51) Int. Cl.
*B60C 23/00* (2006.01)
*B60C 23/04* (2006.01)
(Continued)

(52) U.S. Cl.
CPC ........ *B60C 23/0486* (2013.01); *B60C 23/064* (2013.01); *B60C 25/007* (2013.04);
(Continued)

(58) Field of Classification Search
None
See application file for complete search history.

(56) References Cited

U.S. PATENT DOCUMENTS 9,116,072 B2 * 8/2015 Gorczyca ............ B60C 23/0408
2002/0157461 A1 * 10/2002 Schmidt ................ B60C 23/007
73/146
(Continued)

FOREIGN PATENT DOCUMENTS

WO    WO-2014141690 A1    9/2014
WO    WO-2015141199 A1    9/2015
(Continued)

OTHER PUBLICATIONS

Hamada, "Germany Continental, Inc., delevloped the TPMS to calculate the air pressure from the deformation of the tread", Nikkei Technology Online, Sep. 9, 2011. URL: http://techon.nikkeibp.co.jp/article/NEWS/20110909/198106/.

*Primary Examiner* — Julie Lieu
(74) *Attorney, Agent, or Firm* — Harness, Dickey & Pierce, P.L.C.

(57) ABSTRACT

Data representing a ground contact time of a tire is transmitted from a tire side device, and received by a vehicle side device to calculate the ground contact time of the tire, to thereby calculate a ground contact length of the tire at that time. In a situation where a tire air pressure may change such as a tire exchange, the ground contact length at that time is set as a reference ground contact length, and a determination reference value is set on the basis of the reference ground contact length. As a result, the relative determination reference value corresponding to the tire type can be set, and a variation of the reduction rate of the tire air pressure when it is determined that the tire air pressure is reduced can be
(Continued)

reduced. As a result, the reduction in the tire air pressure can be detected with high precision regardless of the tire type.

5 Claims, 4 Drawing Sheets

(51) Int. Cl.
    *G01L 17/00*          (2006.01)
    *B60C 23/06*         (2006.01)
    *B60C 25/00*         (2006.01)
    *B60C 25/05*         (2006.01)
    *G01B 17/00*         (2006.01)

(52) U.S. Cl.
    CPC .......... *B60C 25/0551* (2013.04); *G01B 17/00* (2013.01); *G01L 17/00* (2013.01)

(56) References Cited

U.S. PATENT DOCUMENTS

| | | | |
|---|---|---|---|
| 2005/0075825 A1* | 4/2005 | Zheng | B60C 23/064 |
| | | | 702/140 |
| 2011/0113876 A1 | 5/2011 | Kammann | |
| 2012/0310475 A1* | 12/2012 | Fujii | G01M 17/021 |
| | | | 701/33.9 |
| 2016/0303928 A1* | 10/2016 | Benbouhout | B60C 23/0408 |

FOREIGN PATENT DOCUMENTS

| | | |
|---|---|---|
| WO | WO-2015141200 A1 | 9/2015 |
| WO | WO-2015141201 A1 | 9/2015 |
| WO | WO-2015174031 A1 | 11/2015 |

* cited by examiner

GROUND CONTACT LENGTH

VIBRATION DURING GROUND CONTACT

GROUND CONTACT START TIME

GROUND CONTACT END TIME

TIME [sec]

OUTPUT VOLTAGE [V]

TIRE CONDITION DETECTION DEVICE

CROSS-REFERENCE TO RELATED APPLICATIONS

This application is a U.S. National Phase Application under 35 U.S.C. 371 of International Application No. PCT/JP2015/001004 filed on Feb. 26, 2015 and published in Japanese as WO 2015/141152 A1 on Sep. 24, 2015. This application is based on and claims the benefit of priority from Japanese patent application No. 2014-054928 filed on Mar. 18, 2014. The entire disclosures of all of the above applications are incorporated herein by reference.

TECHNICAL FIELD

The present disclosure relates to a tire condition detection device that detects a reduction in a tire air pressure on the basis of a detection signal from a vibration detector provided in a tire.

BACKGROUND ART

Up to now, Patent Literature 1 has proposed a technique in which an acceleration sensor is embedded in a rear surface of a tire tread, and a tire air pressure is estimated on the basis of a detection signal of the acceleration sensor. Specifically, when the acceleration sensor using a piezoresistive effect is embedded in the rear surface of the tire tread, the detection signal reaches vibration peaks at timing when a portion of the tire tread corresponding to a placement position of the acceleration sensor contacts the ground as the tire rotates, and at a timing when the portion is no longer contacting the ground (hereinafter the timing when the tire contacts the ground is called "ground contact start time", and the timing when the tire is no longer contacting the ground is called "ground contact end time"). For that reason, up to now, a ground contact length corresponding to a length of a tire ground contact surface in a tire traveling direction is calculated on the basis of an interval between the two vibration peaks generated at the ground contact start time and the ground contact end time, and a vehicle speed. Then, the tire air pressure is estimated on the basis of the ground contact length.

PRIOR ART LITERATURE

Patent Literature

Patent Literature 1: US 2011/0113876 A1

SUMMARY OF INVENTION

However, according to the study of the inventors of the present disclosure, because the ground contact length to the tire air pressure varies for each tire type, there is a risk that the tire air pressure cannot be estimated with high precision.

In view of the foregoing points, it is an object of the present disclosure to provide a tire condition detection device which is capable of detecting a reduction in a tire air pressure with high precision regardless of the tire type.

In an aspect of the present disclosure, a tire condition detection device includes a tire side device and a vehicle side device.

The tire side device includes a vibration detector that is fitted to a rear surface of a tread of a tire and that outputs a detection signal corresponding to a magnitude of vibration of the tire, a signal processor that, based on the detection signal of the vibration detector, outputs data representing a ground contact time for a portion of the tread corresponding to a placement position of the vibration detector during one rotation of the tire, and a transmitter that transmits data representing the ground contact time.

The vehicle side device includes a receiver that receives the data representing the ground contact time transmitted from the transmitter, a calculator that, based on the data representing the ground contact time and a vehicle speed, calculates a ground contact length of the tire, a change recognizer that recognizes that an occurrence of a situation in which an air pressure of the tire may change, and a determiner that determines a reduction in a tire air pressure based on a relative change, from a reference ground contact length, of the ground contact length of the tire calculated during travel of the vehicle, wherein the reference ground contact length is the ground contact length of the tire calculated according to the data representing the ground contact time at a travel start time subsequent to recognizing the occurrence of the situation in which the air pressure of the tire may change.

As described above, the data representing the ground contact time of the tire is transmitted from the tire side device, and received by the vehicle side device to calculate the ground contact time of the tire, to thereby calculate the ground contact length of the tire at that time. In a situation where the tire air pressure may change such as a tire exchange, the ground contact length at that time is set as the reference ground contact length, and the reduction in the tire air pressure is determined on the basis of the relative change of the ground contact length of the tire calculated during the travel of the vehicle to the reference ground contact length. As a result, the relative determination reference value corresponding to the tire type can be set, and a variation of the reduction rate of the tire air pressure when it is determined that the tire air pressure is reduced can be reduced. Hence, the reduction in the tire air pressure can be detected with high precision regardless of the tire type.

DESCRIPTION OF EMBODIMENTS

Embodiments of the present disclosure will be described below with reference to the accompanying drawings. In the following respective embodiments, parts identical with or equivalent to each other are denoted by the same symbols for description.

First Embodiment

A tire condition detection device according to the present embodiment will be described with reference to FIGS. 1 to 5. The tire condition detection device according to the present embodiment is used to detect a reduction in a tire air pressure on the basis of a ground contact length of a ground contact surface of a tire provided in each wheel of a vehicle, in other words, a length of the ground contact surface in a tire traveling direction.

Figure 1:
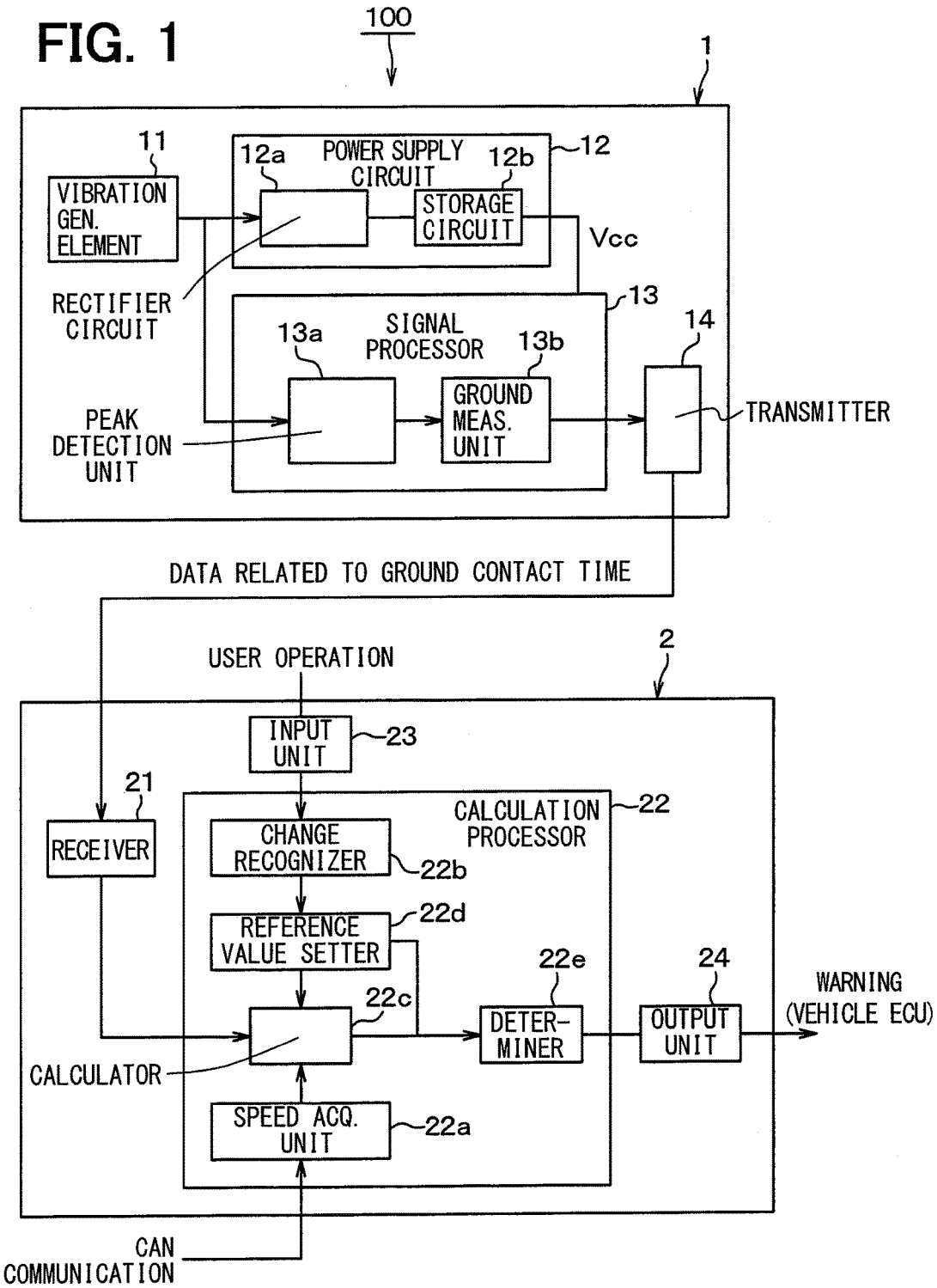
FIG. 1 is a diagram illustrating an overall block configuration of a tire condition detection device according to a first embodiment of the present disclosure.

As illustrated in FIG. 1, a tire condition detection device 100 includes a tire side device 1 provided on a tire side and a vehicle side device 2 provided on a vehicle body side. The tire condition detection device 100 transmits ground contact time data as data related to a tire air pressure from the tire side device 1. In the tire condition detection device 100, the vehicle side device 2 receives the data transmitted from the tire side device 1, and detects the reduction in the tire air pressure on the basis of the received data. Specifically, the tire side device 1 and the vehicle side device 2 are configured as follows.

Figure 2:
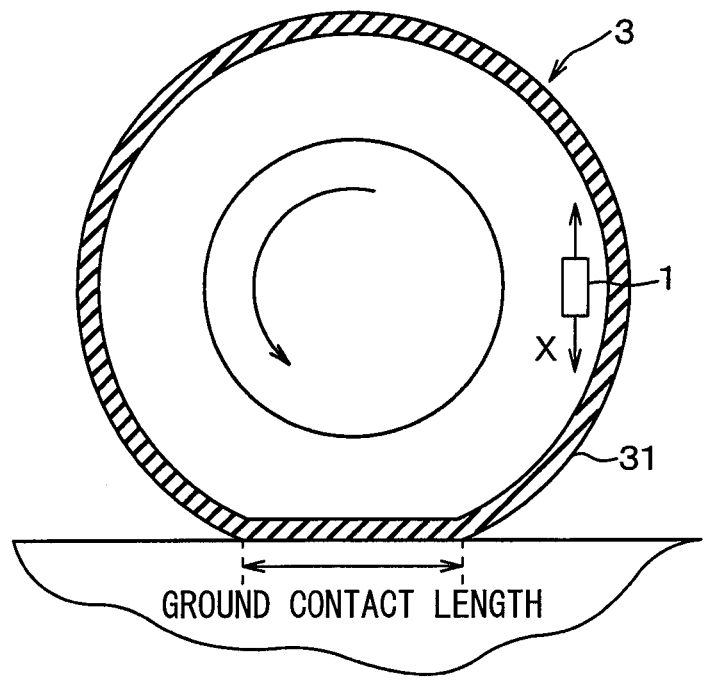
FIG. 2 is a schematic cross-sectional view of a tire to which a tire side device is fixed.

As illustrated in FIG. 1, the tire side device 1 includes a vibration power generation element 11, a power supply circuit 12, a signal processor 13, and a transmitter 14. As illustrated in FIG. 2, the tire side device 1 is disposed on a back surface side of a tread 31 of a tire 3.

The vibration power generation element 11 constitutes a vibration detector that outputs a detection signal corresponding to vibration in a direction contacting a circular orbit drawn by the tire side device 1 when the tire 3 rotates, that is, a tire tangential direction (a direction indicated by an arrow X in FIG. 2). In the present embodiment, the detection signal corresponding to the vibration in the tire tangential direction is output by the vibration power generation element 11, and additionally a vibration energy is converted into an electric energy, and a power supply of the tire side device 1 is generated on the basis of the electric energy. For that reason, the vibration power generation element 11 is disposed to generate a power from the vibration in the tire tangential direction. For example, an electrostatic induction power generation element (electret), a piezoelectric element, a friction element, a magnetostrictive element, or an electromagnetic induction element can be applied as the vibration power generation element 11 of that type. If only the detection signal corresponding to the vibration in the tire tangential direction is output without considering an intended purpose for power generation, others, for example, an acceleration sensor can be used.

For example, in the case where the electrostatic induction power generation element is used as the vibration power generation element 11, when an upper electrode to be positively charged by electrostatic induction vibrates in a horizontal direction with respect to a lower electrode having negative charges, static charges caused by the electrostatic induction are varied, and an electromotive force is produced to generate a power. The power supply of the tire side device 1 is generated on the basis of the power generation of the vibration power generation element 11, and the detection signal corresponding to the magnitude of vibration in the tire tangential direction is generated.

In other words, when the vehicle having the tire condition detection device 100 travels, the tread 31 of the tire 3 vibrates due to various factors such as a rotational movement of the tire 3 and unevenness of a road surface. The vibration is transmitted to the vibration power generation element 11 to generate a power by the vibration power generation element 11. The generated power is transmitted to the power supply circuit 12 to generate a power supply of the tire side device 1. An output voltage when generating the power by the vibration power generation element 11 is changed according to the magnitude of vibration. For that reason, the output voltage of the vibration power generation element 11 is transmitted to the signal processor 13 as the detection signal representing the magnitude of vibration in the tire tangential direction. The output voltage of the vibration power generation element 11 is an AC voltage since the upper electrode reciprocates due to the vibration.

The power supply circuit 12 stores electricity on the basis of the output voltage of the vibration power generation element 11 to generate the power supply, and supplies the power to the signal processor 13 and the transmitter 14. The power supply circuit 12 includes a rectifier circuit 12a and an electric storage circuit 12b.

The rectifier circuit 12a is a known circuit that converts the AC voltage output from the vibration power generation element 11 into a DC voltage. The AC voltage output by the vibration power generation element 11 is converted into a DC voltage by the rectifier circuit 12a, and output to the electric storage circuit 12b. The rectifier circuit 12a may be configured by a full-wave rectifier circuit or a half-wave rectifier circuit.

The electric storage circuit 12b stores the DC voltage applied from the rectifier circuit 12a, and is configured by a capacitor or the like. The output voltage of the vibration power generation element 11 is stored in the electric storage circuit 12b through the rectifier circuit 12a. With the voltage stored in the electric storage circuit 12b as a power supply, the power is supplied to the signal processor 13 or the transmitter 14 provided in the tire side device 1. With the provision of the electric storage circuit 12b in the power supply circuit 12, when the vibration power generation element 11 excessively generate the power, the electric storage circuit 12b stores an excessive power, and when the amount of power generation is insufficient, the power supply circuit 12 compensates the insufficient power.

The signal processor 13 is a portion corresponding to the signal processor, and uses the output voltage of the vibration power generation element 11 as the detection signal representing the vibration data in the tire tangential direction. The signal processor 13 processes the detection signal to obtain data on the tire air pressure, and transmits the obtained data to the transmitter 14. In other words, the signal processor 13 measures a ground contact time of the vibration power generation element 11 during the rotation of the tire 3 on the basis of a change in the output voltage of the vibration power generation element 11 with time. In other words, the signal processor 13 measures the ground contact time of a portion corresponding to a placement position of the vibration power generation element 11 in the tread 31 of the tire 3. Since the ground contact time of the vibration power generation element 11 becomes data on the ground contact length of the ground contact surface of the tire 3, that is, data representing the tire air pressure, the signal processor 13 transmits the data representing the ground contact time to the transmitter 14.

Specifically, the signal processor 13 includes a known microcomputer having, for example, a CPU, a ROM, a RAM, and an I/O, and performs the above processing according to programs stored in the ROM and so on. The signal processor 13 includes a peak detection unit 13a and a ground contact time measurement unit 13b as function units for performing those processes.

Figure 3:
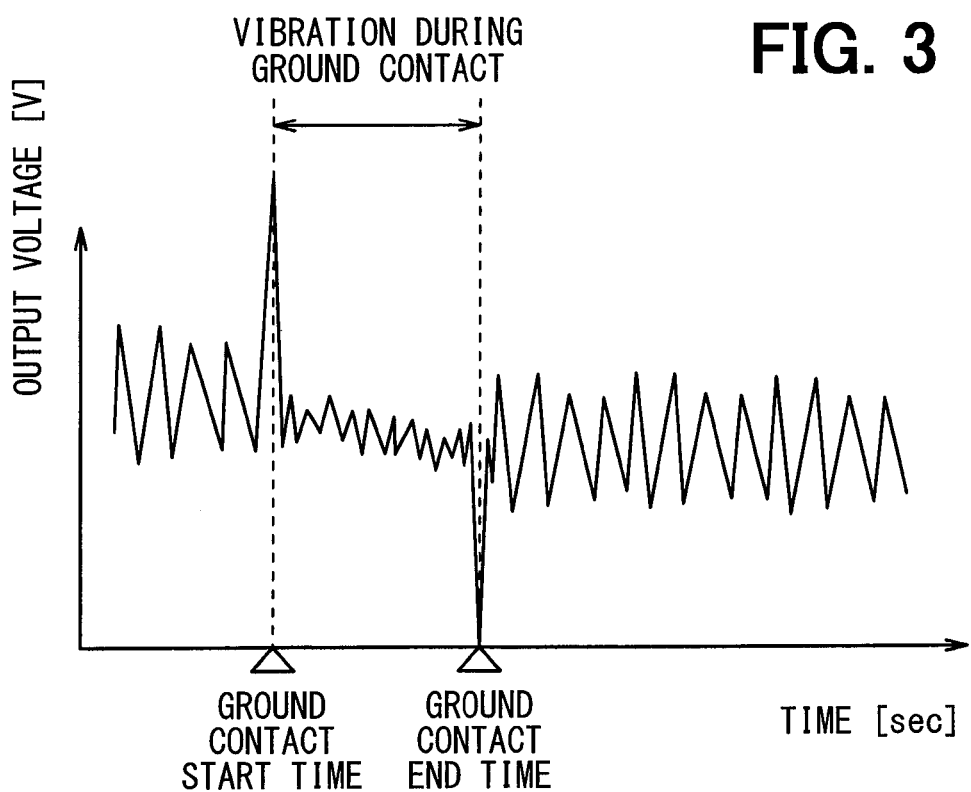
FIG. 3 is an output voltage waveform diagram of a vibration power generation element during tire rotation.

The peak detection unit 13a detects a peak value of the detection signal represented by the output voltage of the vibration power generation element 11. An output voltage waveform of the vibration power generation element 11 during tire rotation is, for example, illustrated in FIG. 3. As illustrated in the figure, at a ground contact start time when a portion of the tread 31 corresponding to the placement position of the vibration power generation element 11 starts to contact the ground with the rotation of the tire 3, the output voltage of the vibration power generation element 11 reaches a maximum value. The peak detection unit 13a detects the ground contact start time when the output voltage of the vibration power generation element 11 reaches the maximum value as a timing of a first peak value. Further, as illustrated in FIG. 3, at a ground contact end time when changing from a state in which the portion of the tread 31 corresponding to the placement position of the vibration power generation element 11 contacts the ground to a state in which the portion no longer contacts the ground with the rotation of the tire 3, the output voltage of the vibration power generation element 11 reaches a minimum value. The peak detection unit 13a detects the ground contact end time when the output voltage of the vibration power generation element 11 reaches the minimum value as a timing of a second peak value.

The reason why the vibration power generation element 11 reaches the peak values at the timings described above will be described below. That is, when the portion of the tread 31 corresponding to the placement position of the vibration power generation element 11 contacts the ground with the rotation of the tire 3, a portion of the tire 3 which has been shaped into substantially a cylindrical surface till that time in the vicinity of the vibration power generation element 11 is pressed, and deformed into a planar shape. Upon receiving an impact at the time of the deformation, the output voltage of the vibration power generation element 11 reaches the first peak value. When the portion of the tread 31 corresponding to the placement position of the vibration power generation element 11 is separated from the ground contact surface with the rotation of the tire 3, the tire 3 is released from being pressed and returned to the substantially cylindrical shape from the planar shape in the vicinity of the vibration power generation element 11. Upon receiving the impact when returning the shape of the tire 3 to the original, the output voltage of the vibration power generation element 11 reaches the second peak value. As described above, the first and second peak values are reached when the vibration power generation element 11 starts to contact the ground and ends to contact the ground, respectively. Because a direction of the impact when the tire 3 is pressed is opposite to a direction of the impact when the tire 3 is released from being pressed, signs of the output voltage are also opposite to each other.

The peak detection unit 13a extracts the data of the detection signals including the timings of the first and second peak values, and transmits the extracted data to the ground contact time measurement unit 13b. In the present specification, the data of the detection signals including the timings of the first and second peak values represent the detection signals per se during a predetermined period including a period extending from the first peak value to the second peak value. The predetermined period including a period extending from the first peak value to the second peak value can be set, for example, as one rotation of the tire. The period of one rotation of the tire is set as a time at which data of at least one rotation of the tire is obtained in a speed range assuming that a vehicle speed at which the reduction in the tire air pressure is to be detected, for example, the vehicle speed range is 40 to 120 km/h or lower. In the speed range of 40 to 120 km/h, the predetermined period is set as a time (for example, 250 ms) during which one rotation or more of the tire is conducted at a minimum speed 40 km/h. The predetermined period may be extended from timing at which one first peak value is obtained to timing at which a next first peak value is obtained. In this example, the data of the detection signals including the timings of the first and second peak values is extracted by the peak detection unit 13a and transmitted to the ground contact time measurement unit 13b. Alternatively, only the data on the timings at which the first and second peak values are obtained may be transmitted to the ground contact time measurement unit 13b.

The ground contact time measurement unit 13b measures the ground contact time of the vibration power generation element 11 on the basis of the data transmitted from the peak detection unit 13a. Specifically, the ground contact time measurement unit 13b measures a time interval between the timing of the first peak value and the timing of the second peak value according to the data transmitted from the peak detection unit 13a. With the above operation, the ground contact time measurement unit 13b measures the ground contact time of the vibration power generation element 11. In this case, when the multiple first peak values and the multiple second peak values are included in the transmitted data, the ground contact time measurement unit 13b measures, for example, a time interval between a timing at which a maximum value of the first peak values is obtained and a timing of a second peak value immediately after the maximum first peak value. Conversely, when the multiple first peak values and the multiple second peak values are included in the transmitted data, the ground contact time measurement unit 13b may measure a time interval between a timing at which a minimum value of the second peak values is obtained and a timing of a first peak value immediately before the minimum second peak value.

For example, when the detection signals of the time at which one rotation or more of the tire is conducted at the minimum speed in the above speed range (40 to 120 km/h) is transmitted, the maximum value in the detection signals is detected as the first peak value. The minimum value is detected in a predetermined time after the timing of the maximum value, for example, in a time (for example, 30 ms) shorter than the time of one rotation of the tire at 120 km/h, and longer than the ground contact time assumed at 40 km/h, and the detected minimum value is detected as the second peak value. A time lag between the timing at which the first peak value is obtained and the timing at which the second peak value is obtained can be set as the ground contact time.

As described above, in the signal processor 13, the ground contact time of the vibration power generation element 11 is measured by the peak detection unit 13a and the ground contact time measurement unit 13b. Then, the signal processor 13 outputs the ground contact time data that is the data on the ground contact time as data on the ground contact length, that is, data representing the tire air pressure to the transmitter 14.

The transmitter 14 transmits the data representing the ground contact time which has been transmitted from the signal processor 13 to the vehicle side device 2. A communication between the transmitter 14 and a receiver 21 provided in the vehicle side device 2 can be implemented by a known short-range wireless communication technique such as Bluetooth (registered trademark). A timing at which the data representing the ground contact time is transmitted is arbitrary, and can be set to, for example, a time when the ground contact time per one rotation of the tire 3 can be acquired. After data for multiple rotations of the tire 3 has been stored, the stored data may be transmitted. In that case, because an operation rate of the transmitter 14 can be suppressed, a power consumed by the transmitter 14 can be reduced.

The data representing the ground contact time is transmitted together with unique identification information (ID information) on a wheel provided for each tire 3 equipped in the vehicle in advance. Since a position of each wheel can be identified by a known wheel position detection device for detecting any position of the vehicle to which the wheel is attached, the data representing the ground contact time is transmitted to the vehicle side device 2 together with the ID information, thereby being capable of discriminating which wheel the data is related to.

On the other hand, the vehicle side device 2 includes the receiver 21, a calculation processor 22, an input unit 23, and an output unit 24. The vehicle side device 2 receives the data representing the ground contact time transmitted from the tire side device 1, and performs various processes on the basis of the received data to detect a reduction in the tire air pressure of each wheel.

The receiver 21 receives the data representing the ground contact time which has been transmitted by the tire side device 1. The data representing the ground contact time received by the receiver 21 is sequentially output to the calculation processor 22 every time receiving the data.

The calculation processor 22 includes a known microcomputer having a CPU, a ROM, a RAM, an I/O and the like, and performs the above various processing according to programs stored in the ROM and so on. The calculation processor 22 includes a vehicle speed acquisition unit 22*a*, a change recognizer 22*b*, a calculator 22*c*, a reference value setter 22*d*, and a determiner 22*e* as function units for performing those processing.

The vehicle speed acquisition unit 22*a* acquires the vehicle speed data calculated by the vehicle ECU (electronic control unit), for example, on the basis of the detection signals of a vehicle speed sensor and a wheel speed sensor through a CAN (registered trademark, controller area network) communication which is a vehicle network, to thereby acquire the vehicle speed.

The change recognizer 22*b* recognizes that a situation, in which the tire air pressure changes, has occurred on the basis of the operation of the input unit 23 by the user. The tire air pressure can change, for example, when a tire exchange or a tire air pressure adjustment is performed. For that reason, the input unit 23 is provided for inputting the occurrence of a situation in which the tire air pressure may change. When the user operates the input unit, a signal is input to the change recognizer 22*b* indicating the occurrence of the situation in which the tire air pressure may change. On the basis of the input signal, the change recognizer 22*b* outputs a command signal to the reference value setter 22*d*, and sets a reference value. In this case, the change recognizer 22*b* is described in an exemplary manner as recognizing the occurrence of the situation in which the tire air pressure may change when the input unit 23 is operated by the user. However, the change recognizer 22*b* is not limited to reacting to the operation of the input unit 23 by the user. For example, because the tire air pressure may change during parking, the change recognizer 22*b* can automatically recognize the occurrence of a situation in which the tire air pressure may change and set the reference value when the engine is started. In other words, the occurrence of a situation in which the tire air pressure may change can be automatically recognized on the vehicle side.

The calculator 22*c* is a portion for estimating the tire air pressure, and estimatively calculates the tire air pressure according to the data representing the ground contact time transmitted from the tire side device 1 and the vehicle speed data acquired by the vehicle speed acquisition unit 22*a*. For example, the calculator 22*c* calculates the ground contact length of the tire 3 according to the vehicle speed and the ground contact time. For example, when the vehicle speed is 60 km/h and the ground contact time is 6 msec, the vehicle speed can be multiplied by the ground contact time to obtain the ground contact length of 10 cm.

When inputting the command signal from the change recognizer 22*b*, the reference value setter 22*d* sets a determination reference value that is a threshold for determining a reduction in the tire air pressure. Specifically, the reference value setter 22*d* sets the determination reference value on the basis of the ground contact length after the tire exchange or the tire air pressure adjustment. Now, a relationship between the ground contact length after the tire air pressure adjustment and the determination reference value will be described with reference to FIGS. 4 and 5.

Figure 4:
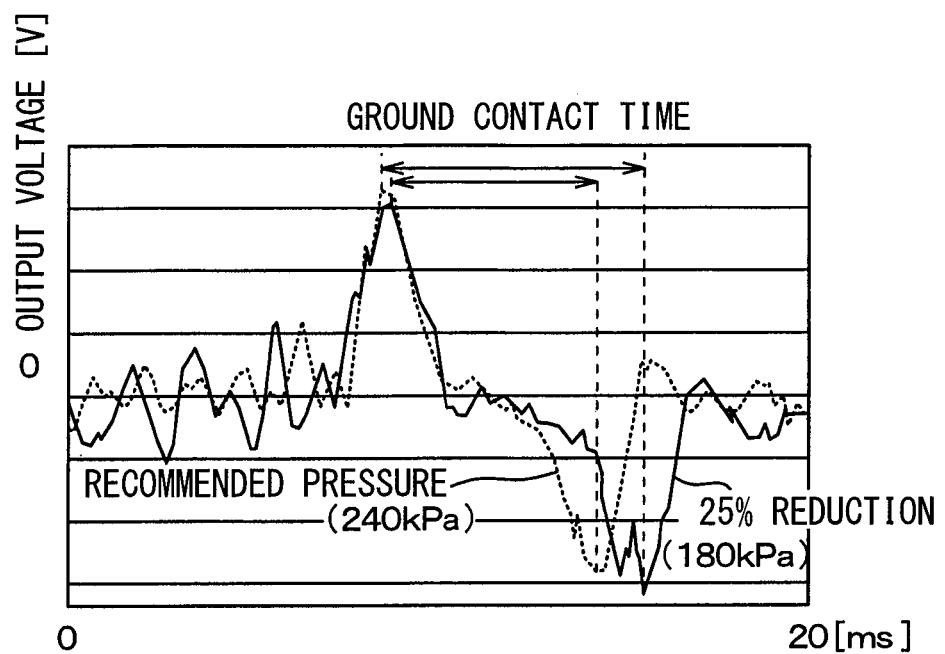
FIG. 4 is an output voltage waveform diagram of the vibration power generation element when a tire air pressure is a recommended pressure and when the tire air pressure is reduced from the recommended pressure by 25% in a standard tire.

FIG. 4 illustrates an output voltage waveform of the vibration power generation element 11 when a tire air pressure is a recommended pressure and when the tire air pressure is reduced from the recommended pressure by 25% in a standard tire. As illustrated in the figure, the output voltage waveform of the vibration power generation element 11 is different between a case in which the tire air pressure is a recommended pressure and a case in which the tire air pressure is reduced. As compared with the case in which the tire air pressure is reduced, when the tire air pressure is the recommended pressure, the dent amount of the tire 3 is reduced, and therefore the ground contact length is shortened. As illustrated in FIG. 4, as compared with the case in which the tire air pressure is reduced, when the tire air pressure is the recommended pressure, the time interval between the first peak value and the second peak value is shortened.

FIG. 4 shows an example in which the tire side device 1 is fitted to a standard tire. However, because the ground contact length to the tire air pressure is varied for each tire type, an output voltage characteristic of the vibration power generation element 11 is also different for each tire type. For example, in the case of an eco tire, as compared with the standard tire, because a ground contact area is reduced so that a frictional force can be reduced, the ground contact length is shortened. Conversely, in the case of a studless tire, as compared with the standard tire, because the ground contact area is increased so that the frictional force can be increased, the ground contact length is increased.

However, it has been found through experimental results that, even if the type of tire is different, a manner of a change in the ground contact length when the tire air pressure is reduced, that is, a relative amount of change in the ground contact length is kept substantially constant.

Figure 5:
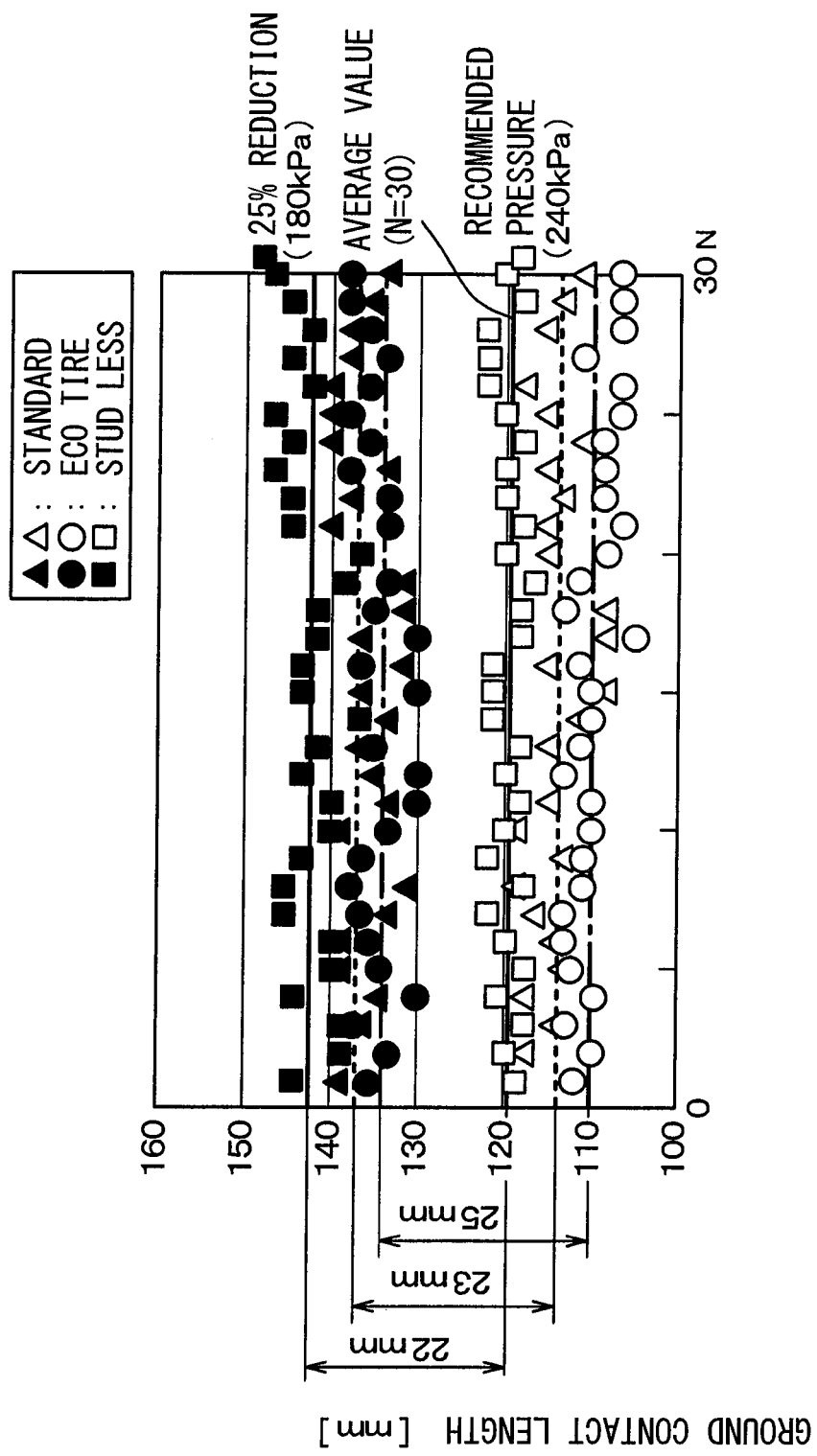
FIG. 5 is a diagram illustrating results of examining a change in the ground contact length when the tire air pressure is the recommended pressure and when the tire air pressure is reduced by 25% with a change in the tire type.

FIG. 5 illustrates the results of examining a change in the ground contact length when the tire air pressure is the recommended pressure and when the tire air pressure is reduced by 25% with a change in the tire type. Specifically, the vehicle is allowed to travel at a vehicle speed of 40 to 80 km/h, and the ground contact lengths obtained by 30 rotations (about three seconds) of the tire 3 are plotted.

As illustrated in the figure, the ground contact length when the tire air pressure is the recommended pressure is varied according to the tire type, and as described above, the results that the ground contact length is shorter in the stated order of the studless tire, the standard tire, and the eco tire are obtained. On the other hand, similarly, the ground contact length when the tire air pressure is reduced by 25% from the recommended pressure is varied according to the tire type, and even in this case, the results that the ground contact length is shorter in the stated order of the studless tire, the standard tire, and the eco tire are obtained. That is, the results that the manner of the change in the ground contact length when the tire air pressure is reduced, that is, the relative amount of change in the ground contact length is kept substantially constant even if the type of tire is different are obtained.

In an example illustrated in FIG. 5, when the tire air pressure is reduced by 25% from the recommended pressure in the standard tire, the ground contact length is changed from 114 mm to 137 mm, and a difference in the ground contact length is 23 mm. When the tire air pressure is reduced by 25% from the recommended pressure in the eco tire, the ground contact length is changed from 110 mm to 135 mm, and a difference in the ground contact length is 25 mm. When the tire air pressure is reduced by 25% from the recommended pressure in the studless tire, the ground contact length is changed from 120 mm to 142 mm, and a difference in the ground contact length is 22 mm.

Therefore, if the determination reference value that is a threshold for determining a reduction in the tire air pressure is set on the basis of the ground contact length with the ground contact length of the tire 3 when the tire exchange or the tire air pressure adjustment is performed as the reference ground contact length, the relative determination reference value corresponding to the tire type can be set. For that reason, in the present embodiment, the determination reference value is set on the basis of the ground contact length of the tire 3 calculated when the vehicle starts to travel upon receiving the command signal from the change recognizer 22b. Because the ground contact length is longer than the reference ground contact length when the tire air pressure is reduced, for example, a value obtained by adding a predetermined value (for example, 22 mm) to the calculated reference ground contact length is set as the determination reference value.

When the determination reference value is set as described above, even if the type of tire 3 is changed, a variation in the reduction rate of the tire air pressure determined to be reduced can be reduced. For example, it is assumed that the reduction rate of the tire air pressure determined to be reduced is 25% of the recommended pressure. In the example illustrated in FIG. 5, a variation in the relative amount of change in the ground contact length when the tire air pressure corresponding to the type of tire 3 is reduced by 25% from the recommended pressure is 3 mm (25 mm to 22 mm) at the maximum.

For that reason, if the determination reference value is set to (reference ground contact length+22 mm), even in the eco tire in which the change in the ground contact length when the tire air pressure is reduced by 25% from the recommended pressure is 25 mm, a deviation of the value of the tire air pressure determined to be reduced is only 3 mm. Therefore, even if the determination reference value of the eco tire is set to "reference ground contact length+22 mm", the tire air pressure is determined to be reduced when the tire air pressure is reduced by 22% from the recommended pressure, which is deviated by only 3% from the reduction in the tire air pressure by 25%. In other words, even in any type of tire, the reduction in the tire air pressure can be detected when the tire air pressure is reduced from the recommended pressure by 22% to 25%.

On the other hand, up to now, a uniform determination reference value is set, for example, on the basis of the eco tire in which the ground contact length when the tire air pressure is reduced is shortest, regardless of the tire type. In other words, the determination reference value is set as an absolute value, and the determination reference value is set to, for example, 134 mm so that the tire air pressure can be determined to be reduced when the tire air pressure is reduced by 25% from the recommended pressure in the eco tire. However, the ground contact length when the tire air pressure is reduced by 25% from the recommended pressure is 142 mm as with the studless tire, which is deviated from 134 mm by 8 mm, and the reduction in the tire air pressure would be detected when the tire air pressure is reduced by 17% from the recommended pressure.

Therefore, the determination reference value for the reduction in the tire air pressure is set by the method as in the present embodiment, as a result of which a variation in the reduction rate of the tire air pressure when the tire air pressure is determined to be reduced can be reduced.

The determiner 22e determines whether the tire air pressure is reduced, or not, according to the determination reference value set by the reference value setter 22d and the ground contact length of the tire 3 calculated by the calculator 22c with the use of the data representing the ground contact time transmitted from the tire side device 1 during traveling. Specifically, the determiner 22e compares the calculated ground contact length of the tire 3 with the determination reference value, and detects the reduction in the tire air pressure when the ground contact length becomes equal to or more than the determination reference value. Upon detection of the reduction in the tire air pressure, the determiner 22e transmits the detection signal to the output unit 24. The output unit 24 is electrically connected to the vehicle ECU. Upon receiving the detection signal from the determiner 22e, the output unit 24 outputs a command signal to the vehicle ECU so as to warn the driver of the reduction in the tire air pressure. The vehicle ECU that has receives the command signal from the output unit 24 gives an alarm, for example, through a security alarm not shown, or displays a fact that the tire air pressure is reduced through a display provided in an instrument panel. As a result, the driver can recognize the reduction in the tire air pressure.

The input unit 23 is configured by, for example, a switch, and is operated upon the occurrence of a situation in which the tire air pressure may change. For example, such a situation may occur when the user performs a tire exchange or a tire air pressure adjustment. The input unit 23 communicates its operation to the change recognizer 22b. The tire condition detection device 100 is configured as described above.

As described above, in the tire condition detection device 100 according to the present embodiment, the data representing the ground contact time of the tire 3 is transmitted from the tire side device 1, the data is received by the vehicle side device 2 to calculate the ground contact time of the tire 3, and the ground contact length of the tire 3 at that time is calculated. In the situation where the tire air pressure may change such as the tire exchange, the determination reference value is set on the basis of a reference ground contact length with the ground contact length at that time as the reference ground contact length. As a result, the relative determination reference value corresponding to the tire type can be set, and when it is determined that the tire air pressure is reduced, variations in the reduction rate of the tire air pressure can be reduced. Hence, the reduction in the tire air pressure can be detected with high precision regardless of the tire type.

Other Embodiments

The present disclosure is not limited to the above-mentioned embodiments, and may be appropriately modified.

For example, in the above embodiment, the determination reference value is set by adding the predetermined value to the reference ground contact length. Alternatively, the determination reference value can be set as a value larger than the reference ground contact length by multiplying the reference ground contact length by a predetermined coefficient of 1 or more. In other words, if the reduction in the tire air pressure is detected on the basis of a relative change of the calculated ground contact length to the reference ground contact length, the reduction in the tire air pressure may be detected by another configuration.

In addition, when setting the determination reference value, if the change recognizer 22b recognizes the occurrence of a situation in which the tire air pressure may change, the ground contact length of the tire 3 at a next travel start time is calculated, and the determination reference value is set with the calculated ground contact length as the reference ground contact length. However, the ground contact length of the tire 3 at the travel start time at that time is not limited to the ground contact length obtained from the data representing the ground contact time transmitted from the tire side device 1 in a first rotation of the tire 3 after the travel starts. For example, the ground contact length of the tire 3 may be set to an average value of the ground contact length obtained from the data representing the ground contact time for a predetermined number of rotations, or may be set to an average value of the ground contact length obtained from the data representing the ground contact time for multiple rotations since the travel starts until a predetermined time elapses.

What is claimed is:

1. A tire condition detection device comprising:
    a tire side device including
        a vibration detector that is fitted to a rear surface of a tread of a tire and that outputs a detection signal corresponding to a magnitude of vibration of the tire,
        a signal processor that, based on the detection signal of the vibration detector, outputs data representing a ground contact time for a portion of the tread corresponding to a placement position of the vibration detector during one rotation of the tire, and
        a transmitter that transmits data representing the ground contact time; and
    a vehicle side device including
        a receiver that receives the data representing the ground contact time transmitted from the transmitter,
        a calculator that, based on the data representing the ground contact time and a vehicle speed, calculates a ground contact length of the tire,
        a change recognizer that recognizes that an occurrence of a situation in which an air pressure of the tire may change, and
        a determiner that determines a reduction in a tire air pressure based on a relative change, from a reference ground contact length, of the ground contact length of the tire calculated during travel of the vehicle, wherein
    the reference ground contact length is the ground contact length of the tire calculated according to the data representing the ground contact time at a travel start time subsequent to recognizing the occurrence of the situation in which the air pressure of the tire may change.

2. The tire condition detection device according to claim 1, further comprising:
    a reference value setter that sets a determination reference value to a value obtained by adding a predetermined value to the reference ground contact length, wherein
    the determiner determines the reduction in the tire air pressure when the ground contact length of the tire calculated during the travel of the vehicle is larger than the determination reference value.

3. The tire condition detection device according to claim 1, further comprising:
    a reference value setter that sets a determination reference value to a value larger than the reference ground contact length by multiplying the reference ground contact length with a coefficient, wherein
    the determiner determines the reduction in the tire air pressure when the ground contact length of the tire calculated during the travel of the vehicle is larger than the determination reference value.

4. The tire condition detection device according to claim 1, wherein
    the change recognizer recognizes the occurrence of the situation in which the air pressure of the tire may change when an input unit, which inputs the occurrence of the situation in which the air pressure of the tire may change, is operated, or when the situation is automatically recognized by the vehicle.

5. The tire condition detection device according to claim 1, wherein
    the vehicle side device includes an output unit that, when the determiner determines the reduction in the tire air pressure, outputs a command signal to a vehicle ECU for warning a driver about the reduction in the tire air pressure.

* * * * *